US012423442B2

(12) United States Patent
Cao et al.

(10) Patent No.: US 12,423,442 B2
(45) Date of Patent: Sep. 23, 2025

(54) EXPLAINABLE VULNERABILITY DETECTION METHOD AND SYSTEM BASED ON DUAL-VIEW CAUSAL REASONING

(71) Applicant: YANGZHOU UNIVERSITY, Jiangsu (CN)

(72) Inventors: Sicong Cao, Jiangsu (CN); Xiaobing Sun, Jiangsu (CN); Wei Liu, Jiangsu (CN); Xiaoxue Wu, Jiangsu (CN); Lili Bo, Jiangsu (CN); Bin Li, Jiangsu (CN)

(73) Assignee: YANGZHOU UNIVERSITY, Jiangsu (CN)

( * ) Notice: Subject to any disclaimer, the term of this patent is extended or adjusted under 35 U.S.C. 154(b) by 84 days.

(21) Appl. No.: 18/443,170

(22) Filed: Feb. 15, 2024

(65) Prior Publication Data
US 2025/0190574 A1    Jun. 12, 2025

(30) Foreign Application Priority Data
Dec. 8, 2023    (CN) .......................... 202311689060.4

(51) Int. Cl.
G06F 21/57    (2013.01)
(52) U.S. Cl.
CPC ...... *G06F 21/577* (2013.01); *G06F 2221/033* (2013.01)
(58) Field of Classification Search
CPC .......................... G06F 21/577; G06F 2221/033
USPC ......................................................... 726/25
See application file for complete search history.

(56) References Cited

U.S. PATENT DOCUMENTS

| 2020/0159934 A1* | 5/2020 | Yamaguchi | ......... G06F 16/9024 |
| 2024/0184892 A1* | 6/2024 | Ganz | ...................... G06F 21/563 |
| 2024/0330455 A1* | 10/2024 | Sahu | ...................... G06F 21/577 |
| 2025/0021657 A1* | 1/2025 | Andriukhin | ........... G06F 21/577 |
| 2025/0028840 A1* | 1/2025 | Zhang | ................... G06F 21/577 |

OTHER PUBLICATIONS

Yi Li et al., "Vulnerability Detection with Fine-Grained Interpretations", ESEC/FSE' 21, Aug. 2021, pp. 1-12.

* cited by examiner

*Primary Examiner* — Nicholas R Taylor
(74) *Attorney, Agent, or Firm* — JCIPRNET

(57) ABSTRACT

Disclosed in the present disclosure are an explainable vulnerability detection method and system based on dual-view causal reasoning. The vulnerability detection method includes: S1, obtaining code samples, where the code samples include a training sample and a sample to be detected, sequentially performing data augmentation, static analysis, code property graph construction and feature extraction on the training sample, and obtaining a training data set; and sequentially performing static analysis, code property graph construction and feature extraction on the sample to be detected, and obtaining a data set to be detect; S2, processing the training data set through a hybrid contrastive learning method, and establishing a vulnerability detection model; and inputting the data set to be detected into the vulnerability detection model, and outputting a vulnerability code; and S3, performing causal reasoning on the vulnerability code, and outputting a vulnerability detection explanation.

20 Claims, 2 Drawing Sheets

EXPLAINABLE VULNERABILITY DETECTION METHOD AND SYSTEM BASED ON DUAL-VIEW CAUSAL REASONING

CROSS-REFERENCE TO RELATED APPLICATION

This application claims the priority benefit of China application serial no. 202311689060.4, filed on Dec. 8, 2023. The entirety of the above-mentioned patent application is hereby incorporated by reference herein and made a part of this specification.

TECHNICAL FIELD

The present disclosure relates to the field of software security, in particular to an explainable vulnerability detection method and system based on dual-view causal reasoning.

BACKGROUND

Software vulnerabilities can seriously degrade the performance of computer software and even cause a crash while the software is running. Therefore, it has become quite a challenge to accurately and efficiently detect potential security vulnerabilities in software. Owing to the great success of deep learning in code-centric software engineering tasks, an increasing number of learning-based vulnerability detection methods have been proposed. Compared to traditional methods that rely heavily on hand-crafted vulnerability specifications, deep learning-based methods focus on building a complex neural network model that automatically learns implicit vulnerability patterns from vulnerable code. However, such methods still have large limitations in practical applications due to the black-box nature of the neural network model. There has been some work using explainable artificial intelligence techniques to explain the decision logic of a black-box vulnerability detection model. For example, the literature *Vulnerability Detection with Fine-Grained Interpretations* utilizes a GNNExplainer to simplify a target instance into a minimal PDG sub-graph consisting of a set of key statements and program dependencies. However, these methods face two main challenges. First, the perturbation mechanism employed by such methods assumes that code statements removed/retained are consistent with ground truths. Yet, recent studies have pointed out that simple code editing can change model predictions easily. Thus, even if correct predictions are made, the weak robustness of the detection model may also lead to incorrect explanations. Secondly, most existing methods focus on generating explanations from the perspective of factual reasoning, i.e., providing a subset of an input program for which the model makes the same prediction as the original program. However, the explanations extracted through such methods may not be concise enough, covering many redundant but highly relevant statements to predictions of a model, which results in the need for still a significant amount of manpower to perform a secondary audit of explanation results, with little conciseness.

SUMMARY

Interpreter objective: an objective of the present disclosure is to provide an explainable vulnerability detection method and system based on dual-view causal reasoning, which is strong in robustness, high in accuracy and strong in conciseness.

Technical solution: the explainable vulnerability detection method based on dual-view causal reasoning according to the present disclosure includes:

S1, obtaining code samples, where the code samples include a training sample and a sample to be detected, sequentially performing data augmentation, static analysis, code property graph construction and feature extraction on the training sample, and obtaining a training data set; and sequentially performing static analysis, code property graph construction and feature extraction on the sample to be detected, and obtaining a data set to be detected;

S2, processing the training data set through a hybrid contrastive learning method, and establishing a vulnerability detection model; and inputting the data set to be detected into the vulnerability detection model, and outputting a vulnerability code; and S3, performing causal reasoning on the vulnerability code, and outputting a vulnerability detection explanation.

Further, in S1, the data augmentation includes an injection point positioning operation, a mutation operator selection operation, and a code transformation operation; and after the data augmentation, the training sample changes into an unlabeled code corpus and a labeled vulnerability data set.

Further, the static analysis outputs an abstract syntax tree, a control flow graph, and a program dependence graph.

Further, the code property graph includes several nodes, and each node is correspondingly provided with text information and type information.

Further, the feature extraction includes:

S11, performing vector encoding on the text information and the type information of each node, and obtaining an initial node feature; and S12: inputting the initial node feature into a graph feature encoder, updating the feature, and obtaining feature embedding of the node.

Further, in the contrastive learning method, a self-supervised contrastive loss of the feature embedding corresponding to the unlabeled code corpus and a supervised contrastive loss of the feature embedding corresponding to the labeled vulnerability data set are calculated, losses are merged, and the vulnerability detection model is generated by training.

Further, S3 specifically includes:

S31, calculating a factual explanation sub-graph and a counterfactual explanation sub-graph; and S32: processing the fact explanation sub-graph and the counterfactual explanation sub-graph according to a scaled constraint solving strategy, and generating an optimal explanation sub-graph as the vulnerability detection explanation.

Technical solution: the explainable vulnerability detection system based on dual-view causal reasoning according to the present disclosure includes:

a code sample processing module configured to obtain code samples, where the code samples include a training sample and a sample to be detected, sequentially perform data augmentation, static analysis, code property graph construction and feature extraction on the training sample, and obtain a training data set; and sequentially perform static analysis, code property graph construction and feature extraction on the sample to be detected, and obtain a data set to be detected;

a vulnerability code output module configured to process the training data set through a hybrid contrastive learning method, and establish a vulnerability detection model; and input the data set to be detected into the vulnerability detection model, and output a vulnerability code; and a vulnerability explainer module configured to perform causal reasoning on the vulnerability code, and output a vulnerability detection explanation.

A computer device according to the present disclosure includes a memory, a processor and a computer program stored on the memory and executable on the processor, where the computer program implements steps of the method when executed by the processor.

A computer-readable storage medium according to the present disclosure stores a computer program, where the computer program implements steps of the method when executed by a processor.

DETAILED DESCRIPTION OF THE EMBODIMENTS

Figure 1:
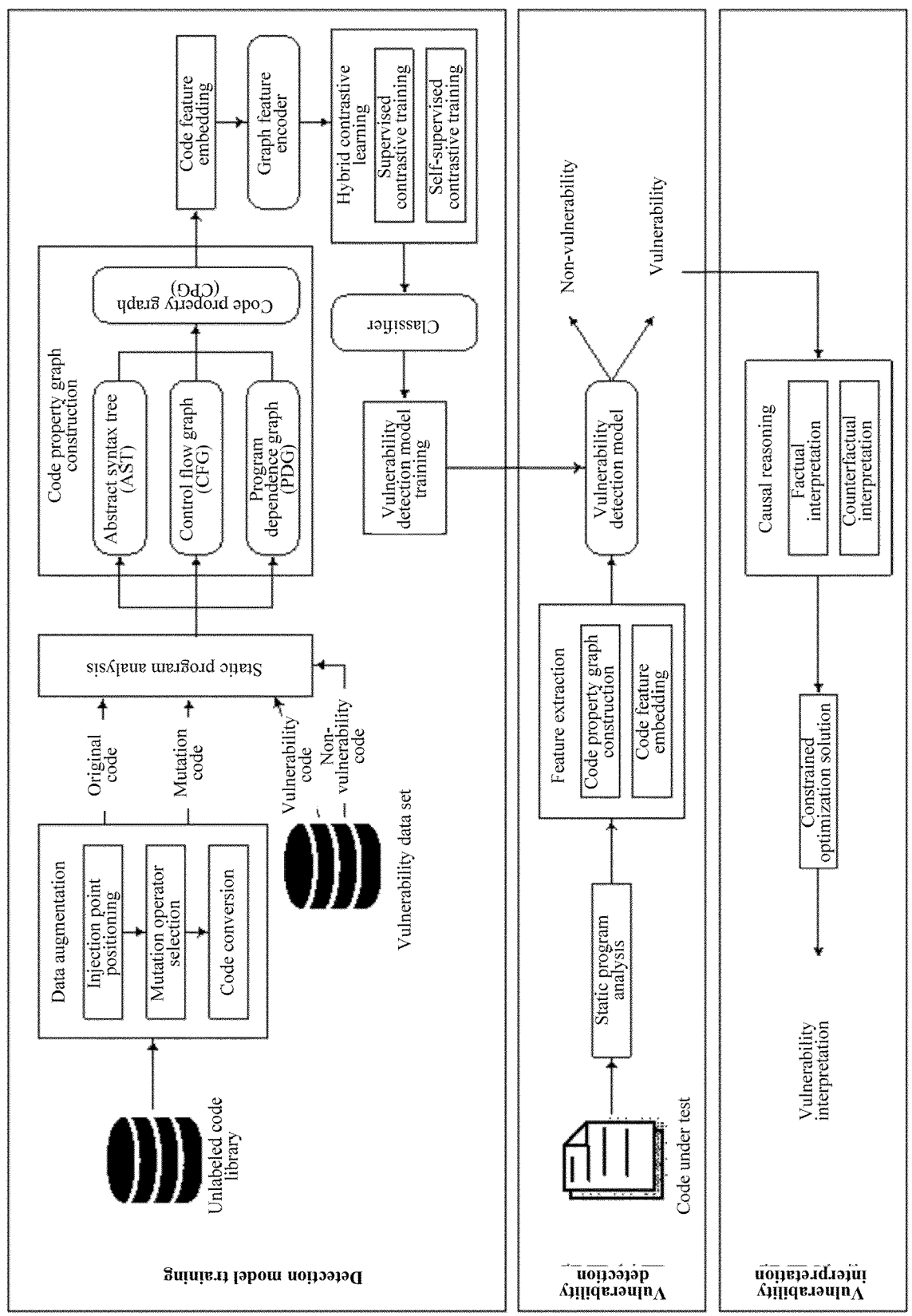
FIG. 1 is a flowchart of a vulnerability detection method according to the present disclosure.

The present disclosure will be further elaborated hereafter in conjunction with the drawing s and specific embodiments.

Figure 2:
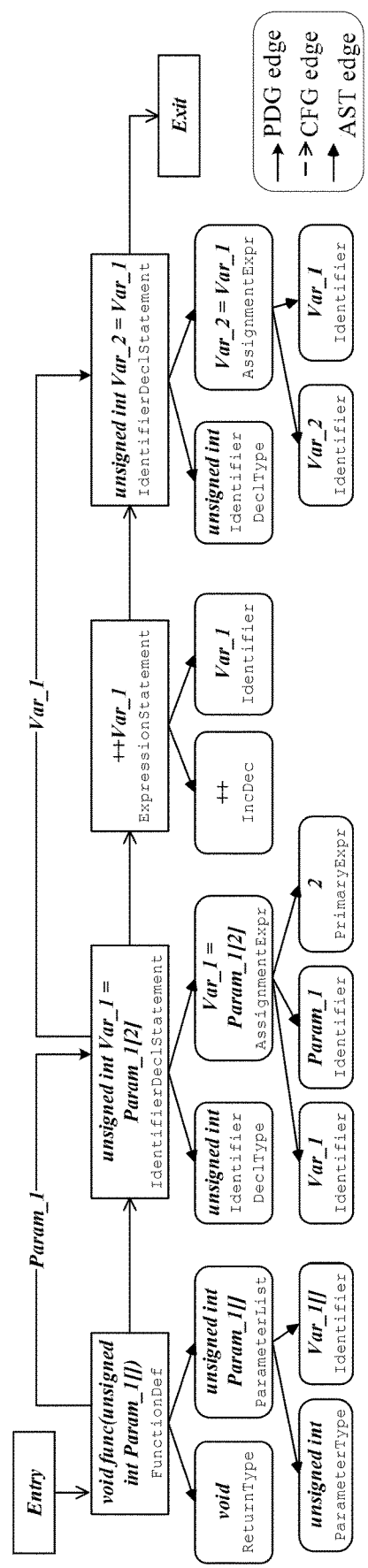
FIG. 2 is a schematic diagram of a code property graph of a training sample.

With reference to FIGS. 1-2, disclosed in the present disclosure are an explainable vulnerability detection method and system based on dual-view causal reasoning.

The explainable vulnerability detection method based on dual-view causal reasoning includes:

S1, obtain code samples, where the code samples include a training sample and a sample to be detected, sequentially perform data augmentation, static analysis, code property graph construction and feature extraction on the training sample, and obtain a training data set; and sequentially perform static analysis, code property graph construction and feature extraction on the sample to be detected, and obtain a data set to be detected;

S2, process the training data set through a hybrid contrastive learning method, and establish a vulnerability detection model; and input the data set to be detected into the vulnerability detection model, and output a vulnerability code;

S3, perform causal reasoning on the vulnerability code, and output a vulnerability detection explanation.

The explainable vulnerability detection system based on dual-view causal reasoning includes:

a code sample processing module configured to obtain code samples, where the code samples include a training sample and a sample to be detected, sequentially perform data augmentation, static analysis, code property graph construction and feature extraction on the training sample, and obtain a training data set; and sequentially perform static analysis, code property graph construction and feature extraction on the sample to be detected, and obtain a data set to be detected;

a vulnerability code output module configured to process the training data set through a hybrid contrastive learning method, and establish a vulnerability detection model; and input the data set to be detected into the vulnerability detection model, and output a vulnerability code; and a vulnerability explainer module configured to perform causal reasoning on the vulnerability code, and output a vulnerability detection explanation.

In S1 and the code sample processing module, the data augmentation includes an injection point positioning operation, a mutation operator selection operation, and a code transformation operation. After the data augmentation, the training sample changes into an unlabeled code corpus and a labeled vulnerability data set. The data augmentation specifically includes:

1) Injection point positioning operation: an unlabeled sample of the training samples is parsed to position an injection point of a mutation operator that can perform semantically-preserved code transformation.

2) Mutation operator selection operation: an operator library (built-in mutation operator library in Table 1) is constructed, one or more mutation operators suitable for the injection point are randomly selected from the operator library based on the positioned injection point of a mutation operator and used.

TABLE 1

Built-in mutation operator library

| Sequence number | Mutation operator | Description |
| --- | --- | --- |
| 1 | Identifier renaming | Replace a function name or a variable name in a program with a random token |
| 2 | Operator inversion | Invert an operator of a binary logic operation |
| 3 | Statement perturbation | Randomly replace two lines of statements without any program dependencies |
| 4 | Loop exchange | Exchange a while loop and a for loop |
| 5 | Block replacement | Replace a then block corresponding to an If statement with a corresponding else block |
| 6 | If statement conversion | Replace a switch statement with an equivalent If statement |

3) Code transformation operation: code transformation is performed on the mutation operator selected from the operator library, and a semantically equivalent mutation code is constructed. The unlabeled code corpus (including the unlabeled sample and its semantically equivalent variant code) and the labeled vulnerability data set (including a vulnerability code and a non-vulnerability code) corresponding to the training sample are formed.

The static analysis outputs an abstract syntax tree, a control flow graph, and a program dependence graph. In the example, the static analysis is performed by a program compiler. The static analysis for the training samples outputs abstract syntax trees, control flow graphs and program dependence graphs corresponding to the unlabeled code corpus and the labeled vulnerability data set. The static analysis for the sample to be detected outputs an abstract syntax tree, a control flow graph and a program dependence graph corresponding to the sample to be detected.

The code property graph (CPG) is constructed and formed based on the abstract syntax tree (AST), the control flow graph (CFG) and a program dependence graph (PDG) output by the static analysis. The code property graph (CPG) includes several nodes, and each node is correspondingly provided with text information and type information. The code property graph of the training sample includes nodes describing the unlabeled code corpus and the labeled vulnerability data set. The code property graph of the sample to be detected includes a node describing the sample to be detected.

The feature extraction includes:

S11, perform vector encoding on the text information and the type information of each node, and obtain an initial node feature. Code bidirectional encoder representations from transformers (CodeBERT) and label encoding are respectively configured to perform vector encoding on the text information and type information of each node v∈V in the code property graph (CPG), a text feature vector $C_v$ and a type feature vector $T_v$ are obtained, and an initial node feature $h_v^{(0)}$ of the node are obtained through a feature splicing operation:

$$h_v^{(0)} = C_v \| T_v$$

where $\|$ represents a concatenation operator.

S12, embed the initial node feature into the code property graph (CPG) of S11, input the initial node feature and the code property graph into a graph feature encoder (GFE) together, update the feature, and obtain feature embedding of the node. The formulas are as follows:

$$h_v^{(t+1)} = \frac{1}{|R|} \sum_{r \in R} \left( \sigma \left( \sum_{u \in N_r} \alpha_{v,u}^{(t)} z_u^{(t)} \right) \right)$$

$$z_u^{(t)} = W_r^{(t)} h_u^{(t)}$$

where $h_v^{(t+1)}$ represents the feature embedding of the node v after an iterative updating time step t; R∈{AST, CFG, PDG} represents a set of edge types in CPG; $|\cdot|$ represents a size of the set; σ represents a LeakyReLU activation function used; $N_r$ represents a first-order neighbor node of the node v under an edge r; $W_r$ represents a weight matrix of the edge r; $\alpha_{v,m}$ represents attention weights of the node v and the neighbor node u on the edge r; $h_u^{(t)}$ represents feature embedding of the neighbor node u at the time step t; and $z_u^{(t)}$ represents a feature vector of the node u after weight correction.

$$\alpha_{v,u}^{(t)} = \frac{\exp(e_{v,u}^{(t)})}{\sum_{p \in N_r} \exp(e_{v,p}^{(t)})}$$

$$e_{v,u}^{(r)} = \sigma\left(\vec{a}_r^{(t)T} \left(z_v^{(r)} \| z_u^{(r)}\right)\right)$$

where $\vec{a}_r^T$ represents a transpose of a learnable weight vector; $\|$ represents a splice operator; $e_{v,u}^{(t)}$ and $e_{v,p}^{(t)}$ represent correlation degrees between the node v and any of its neighbor nodes u and p at the time step t; and $z_v^{(t)}$ represents the feature vector of the node v after weight correction.

In S2 and the vulnerability code output module, in the contrastive learning method, a self-supervised contrastive loss of the feature embedding corresponding to the unlabeled code corpus and a supervised contrastive loss of the feature embedding corresponding to the labeled vulnerability data set are calculated, losses are merged, and the vulnerability detection model is generated by training. For the feature embedding of the unlabeled code corpus, a self-supervised loss $L_{con}^{self}$ is calculated using noise contrast estimation:

$$L_{con}^{self} = \frac{1}{|B|} \sum_{i \in B} -\log \frac{\exp(H_i' \cdot H_{j(i)}'/\tau)}{\sum_{a \in A(i)} \exp(H_i' \cdot H_a'/\tau)}$$

where $H_i'$ represents a graph-level feature representation of any (original or augmented) sample i after T-round iterations; $H_i^{(T)}=\{h_v^{(T)}\}_v^V$ represents low-dimensional embedding obtained through one multilayer perceptron (MLP) mapping layer; j(i) represents another view of the sample i in a same training batch B; τ represents a temperature coefficient; A(i) represents samples other than the sample i in the training batch B; and $H_a'$ represents a graph-level feature representation of the other samples a after T-round iterations.

For the feature embedding of the labeled vulnerability data set, a supervised contrast loss $L_{con}^{sup}$ is calculated:

$$L_{con}^{sup} = \frac{1}{|B^l|} \sum_{i \in B^l} \frac{-1}{|Q(i)|} \sum_{q \in Q(i)} \log \frac{\exp(H_i' \cdot H_q'/\tau)}{\sum_{a \in A(i)} \exp(H_i' \cdot H_a'/\tau)}$$

where $B^l$ represents a training batch of the vulnerability data set; Q(i) represents a sample consistent with an anchor sample i in label; and $H_q'$ represents a graph-level feature representation of other samples q consistent with the anchor sample i in label after T-round iterations.

The self-supervised contrast loss and the supervised contrast loss are combined to train the graph feature encoder. The trained graph feature encoder is configured to optimize the feature embedding of the vulnerability codes and the non-vulnerability codes in the vulnerability data set, and sends the feature embedding to a classifier based on multilayer perceptron (MLP). The vulnerability detection model is trained by using a cross-entropy loss. The graph feature encoder is trained by means of the following formula:

$$L_{total} = (1 - \lambda)L_{con}^{self} + \lambda L_{con}^{sup}$$

where λ represents a weighting factor that balances the self-supervised contrast loss and the supervised contrast loss.

The step of inputting the data set to be detected into the vulnerability detection model, and outputting a vulnerability code specifically include the following processes. The data set to be detected is obtained by sequentially performing static analysis, code property graph construction and feature extraction on the sample to be detected. A code to be tested is subjected to static analysis through a static program, an abstract syntax tree (AST), a control flow graph (CFG) and a program dependence graph (PDG) are obtained, and a code property graph (CPG) is constructed accordingly. Vector coding is performed on the text information and the type information of each node v∈V in the CPG by using CodeBERT and label coding respectively, a text feature vector $C_v$ and a type feature vector $T_v$ are obtained, initial feature embedding of the node is obtained by using a feature splicing operation, and a data set to be detected is established as input of the vulnerability detection model. After passing through the vulnerability detection model, a function that may have vulnerabilities is output.

S3 and the vulnerability explainer module specifically include:

S31, calculate a factual explanation sub-graph and a counterfactual explanation sub-graph. The factual explanation sub-graph and the counterfactual explanation sub-graph that agree with the model prediction are calculated respectively using a map mask:

$$S_f(M_k, F_k) = P(\hat{y}_k \mid A_k \sqcap M_k, X_k \sqcap F_k)$$

$$S_c(M_k, F_k) = -P(\hat{y}_k \mid A_k - A_k \sqcap M_k, X_k - X_k \sqcap F_k)$$

where $S_f$ and $S_c$ represent factual explanation strength and counterfactual explanation strength respectively; $M_k$ represents an edge mask of an adjacency matrix $A_k$ of the vulnerability code CPG; $F_k$ represents a feature mask of a node feature matrix $X_k$; $\sqcap$ represents a mask operator; $\hat{y}_k$ represents a prediction label of the vulnerability detection model; and P represents probability calculation.

S32: process the fact explanation sub-graph and the counterfactual explanation sub-graph according to a scaled constraint solving strategy, and generate an optimal explanation sub-graph as the vulnerability detection explanation. First, the factual explanation and the counterfactual explanation are combined to balance validity and simplicity of the explanation sub-graphs:

$$\text{minimize } C(M_k, F_k)$$

$$\text{s.t. } S_f(M_k, F_k) > P(y_{k,s} \mid A_k \sqcap M_k, X_k \sqcap F_k)$$

$$S_c(M_k, F_k) > -P(y_{k,s} \mid A_k - A_k \sqcap M_k, X_k - X_k \sqcap F_k)$$

where $C(M_k, F_k)$ represents the number of nodes and edges configured to generate the explanation sub-graphs; $\hat{y}_{k,s}$ represents a label with a maximum prediction probability of the vulnerability detection model in addition to an original prediction label $\hat{y}_k$; and minimize represents a minimization operation.

Then, the optimal explanation sub-graph is generated as the vulnerability detection explanation by using a scaled constraint solving strategy:

$$\text{minimize } \|M_k^*\|_1 + \|F_k^*\|_1 + \gamma L_f + (1-\gamma)L_c$$

$$L_f = ReLU\left(\frac{1}{2} - S_f(M_k^*, F_k^*)\right) + P(\hat{y}_{k,s} \mid A_k \sqcap M_k^*, X_k \sqcap F_k^*)$$

$$L_c = ReLU\left(\frac{1}{2} - S_c(M_k^*, F_k^*)\right) + P(\hat{y}_{k,s} \mid A_k - A_k \sqcap M_k^*, X_k - X_k \sqcap F_k^*)$$

where $L_f$ and $L_c$ represent pairwise contrast losses of the factual explanation and the counterfactual explanation respectively; $\|M_k^*\|_1$ and $\|F_k^*\|_1$ represent L1 norms scaling the edge mask $M_k$ and the feature mask $F_k$ to a real-valued matrix; and $\gamma$ represents a weight coefficient that balances the strength of factual explanation and the counterfactual explanation.

Further disclosed in the present disclosure is a computer device, including a memory, a processor and a computer program stored on the memory and executable on the processor. The computer program implements steps of the method when executed by the processor.

Further disclosed in the present disclosure is a computer-readable storage medium, storing a computer program. The computer program implements steps of the method when executed by a processor.

Beneficial effects: the present disclosure has the following remarkable effects. 1, strong robustness: the robustness of the vulnerability detection model to a perturbation mechanism used by a mainstream explainable framework is enhanced through the hybrid contrastive learning technology, and a false explanation of the model is avoided. 2, high accuracy and strong conciseness: a dual-view causal reasoning technology combining factual reasoning and counterfactual reasoning is proposed to locate a code fragment causing vulnerabilities in a program under test succinctly and accurately according to a prediction result of the model, so as to improve explainability of vulnerability detection.

What is claimed is:

1. An explainable vulnerability detection method based on dual-view causal reasoning, comprising:
    S1, obtaining code samples, wherein the code samples comprise a training sample and a sample to be detected, sequentially performing data augmentation, static analysis, code property graph construction and feature extraction on the training sample, and obtaining a training data set; and sequentially performing static analysis, code property graph construction and feature extraction on the sample to be detected, and obtaining a data set to be detected;
    S2, processing the training data set through a hybrid contrastive learning method, and establishing a vulnerability detection model; and inputting the data set to be detected into the vulnerability detection model, and outputting a vulnerability code; and
    S3, performing causal reasoning on the vulnerability code, and outputting a vulnerability detection explanation.

2. The explainable vulnerability detection method based on dual-view causal reasoning according to claim 1, wherein in S1, the data augmentation comprises an injection point positioning operation, a mutation operator selection operation, and a code transformation operation; and after the data augmentation, the training sample changes into an unlabeled code corpus and a labeled vulnerability data set.

3. The explainable vulnerability detection method based on dual-view causal reasoning according to claim 1, wherein the static analysis outputs an abstract syntax tree, a control flow graph, and a program dependence graph.

4. The explainable vulnerability detection method based on dual-view causal reasoning according to claim 2, wherein the code property graph comprises several nodes, and each node is correspondingly provided with text information and type information.

5. The explainable vulnerability detection method based on dual-view causal reasoning according to claim 4, wherein the feature extraction comprises:
    S11, performing vector encoding on the text information and the type information of each node, and obtaining an initial node feature; and
    S12: inputting the initial node feature into a graph feature encoder, updating the feature, and obtaining feature embedding of the node.

6. The explainable vulnerability detection method based on two-view causal reasoning according to claim 5, wherein in the contrastive learning method, a self-supervised contrastive loss of the feature embedding corresponding to the unlabeled code corpus and a supervised contrastive loss of the feature embedding corresponding to the labeled vulnerability data set are calculated, losses are merged, and the vulnerability detection model is generated by training.

7. The explainable vulnerability detection method based on dual-view causal reasoning according to claim 1, wherein S3 specifically comprises:

S31, calculating a factual explanation sub-graph and a counterfactual explanation sub-graph; and S32: processing the fact explanation sub-graph and the counterfactual explanation sub-graph according to a scaled constraint solving strategy, and generating an optimal explanation sub-graph as the vulnerability detection explanation.

8. An explainable vulnerability detection system based on dual-view causal reasoning, comprising:

a code sample processing module configured to obtain code samples, wherein the code samples comprise a training sample and a sample to be detected, sequentially perform data augmentation, static analysis, code property graph construction and feature extraction on the training sample, and obtain a training data set; and sequentially perform static analysis, code property graph construction and feature extraction on the sample to be detected, and obtain a data set to be detected;

a vulnerability code output module configured to process the training data set through a hybrid contrastive learning method, and establish a vulnerability detection model; and input the data set to be detected into the vulnerability detection model, and output a vulnerability code; and a vulnerability explainer module configured to perform causal reasoning on the vulnerability code, and output a vulnerability detection explanation.

9. A computer device, comprising a memory, a processor and a computer program stored on the memory and executable on the processor, wherein the computer program implements steps of the method according to claim 1 when executed by the processor.

10. A computer device, comprising a memory, a processor and a computer program stored on the memory and executable on the processor, wherein the computer program implements steps of the method according to claim 2 when executed by the processor.

11. A computer device, comprising a memory, a processor and a computer program stored on the memory and executable on the processor, wherein the computer program implements steps of the method according to claim 3 when executed by the processor.

12. A computer device, comprising a memory, a processor and a computer program stored on the memory and executable on the processor, wherein the computer program implements steps of the method according to claim 4 when executed by the processor.

13. A computer device, comprising a memory, a processor and a computer program stored on the memory and executable on the processor, wherein the computer program implements steps of the method according to claim 5 when executed by the processor.

14. A computer device, comprising a memory, a processor and a computer program stored on the memory and executable on the processor, wherein the computer program implements steps of the method according to claim 6 when executed by the processor.

15. A computer device, comprising a memory, a processor and a computer program stored on the memory and executable on the processor, wherein the computer program implements steps of the method according to claim 7 when executed by the processor.

16. A non-transitory computer-readable storage medium, storing a computer program, wherein the computer program implements steps of the method according to claim 1 when executed by a processor.

17. A non-transitory computer-readable storage medium, storing a computer program, wherein the computer program implements steps of the method according to claim 2 when executed by a processor.

18. A non-transitory computer-readable storage medium, storing a computer program, wherein the computer program implements steps of the method according to claim 3 when executed by a processor.

19. A non-transitory computer-readable storage medium, storing a computer program, wherein the computer program implements steps of the method according to claim 4 when executed by a processor.

20. A non-transitory computer-readable storage medium, storing a computer program, wherein the computer program implements steps of the method according to claim 5 when executed by a processor.

* * * * *